Dec. 23, 1958   F. F. CRANDELL ET AL   2,865,247
COMPOUND PHOTOMETRIC DEVICE
Filed Oct. 10, 1955   4 Sheets-Sheet 1
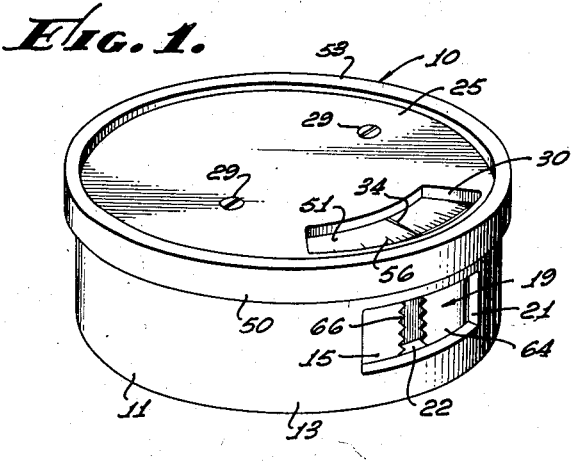
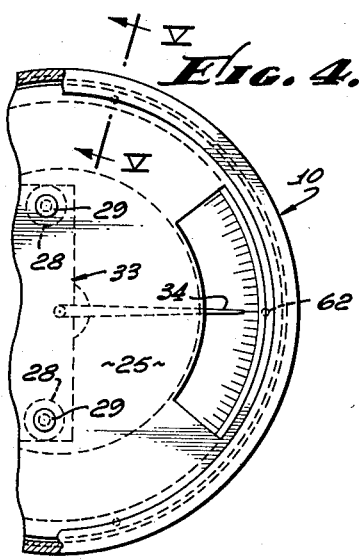
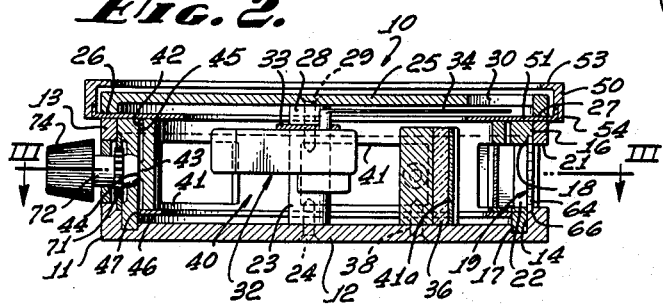
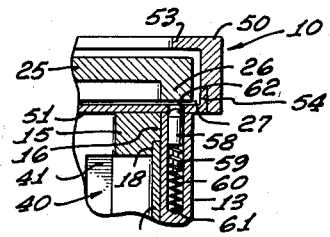
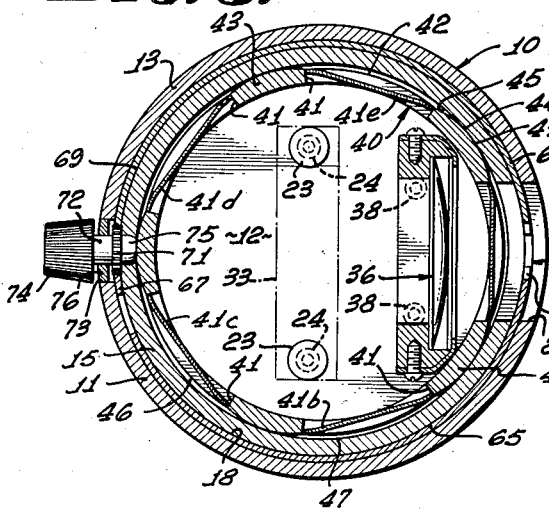
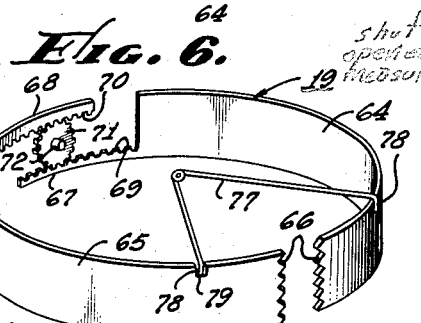
FRANK F. CRANDELL
GEORGE D. PERKINS
INVENTORS.
BY
ATTORNEY.

Dec. 23, 1958   F. F. CRANDELL ET AL   2,865,247
COMPOUND PHOTOMETRIC DEVICE
Filed Oct. 10, 1955   4 Sheets-Sheet 2

FRANK F. CRANDELL
GEORGE D. PERKINS
INVENTORS.

BY
ATTORNEY.

Dec. 23, 1958    F. F. CRANDELL ET AL    2,865,247
COMPOUND PHOTOMETRIC DEVICE
Filed Oct. 10, 1955    4 Sheets-Sheet 3
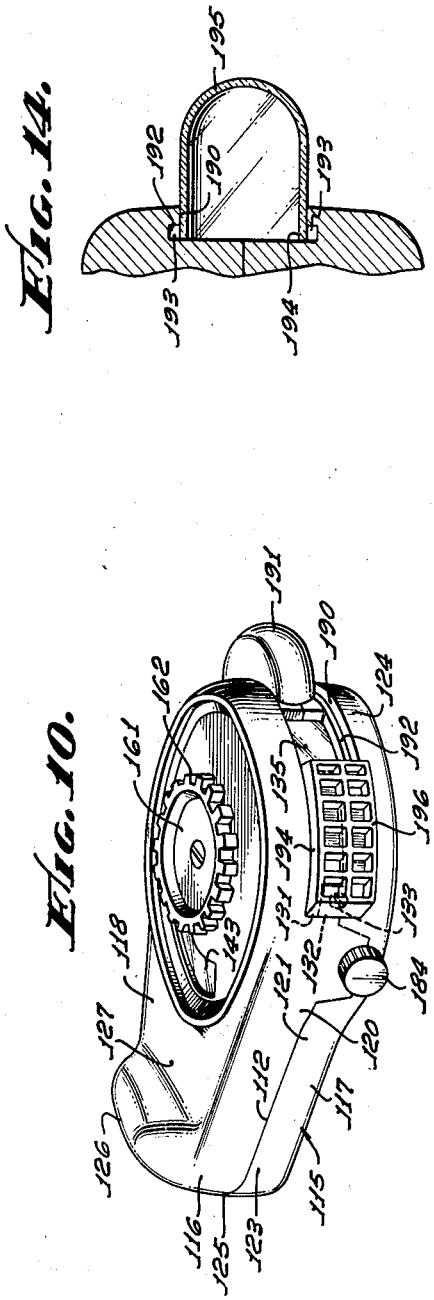
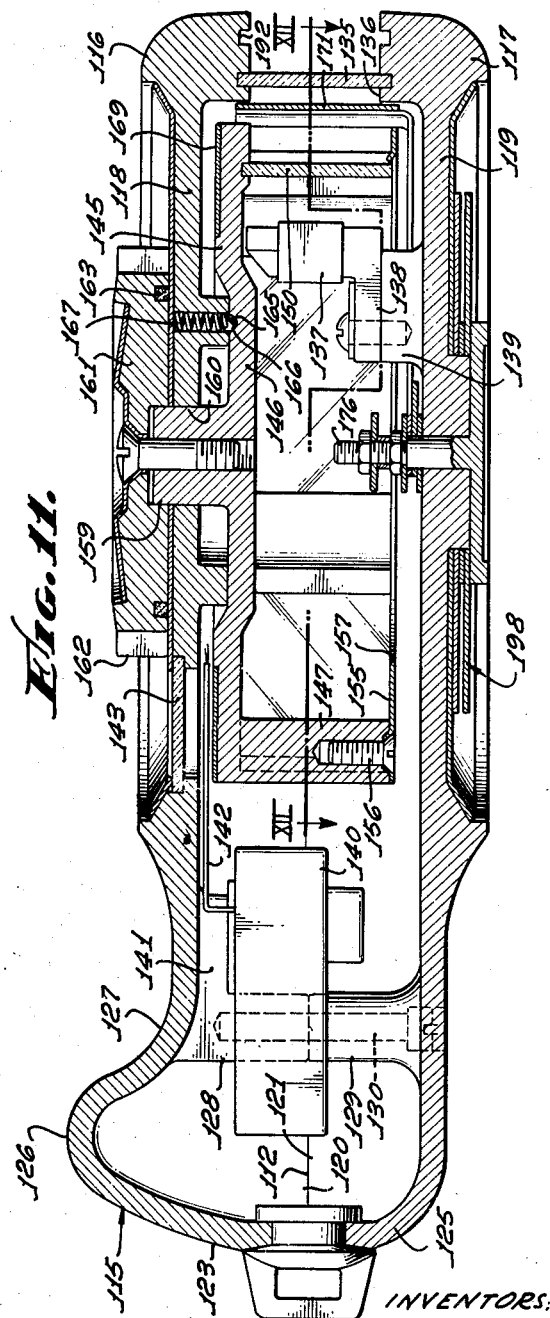
INVENTORS:
FRANK F. CRANDELL
GEORGE D. PERKINS
BY
ATTORNEY.

Dec. 23, 1958   F. F. CRANDELL ET AL   2,865,247
COMPOUND PHOTOMETRIC DEVICE
Filed Oct. 10, 1955   4 Sheets-Sheet 4

FRANK F. CRANDELL
GEORGE D. PERKINS
INVENTORS.

BY
ATTORNEY.

United States Patent Office 2,865,247
Patented Dec. 23, 1958

2,865,247

COMPOUND PHOTOMETRIC DEVICE

Frank F. Crandell, Pasadena, and George D. Perkins, Van Nuys, Calif., assignors to Photo Research Corporation, Hollywood, Calif., a corporation of California Application October 10, 1955, Serial No. 539,302

21 Claims. (Cl. 88—22.5)

This invention relates to a compound light-measuring meter for use in illumination engineering and in the photographic arts. More particularly, the invention relates to a compact, small meter adapted to be held in the palm of a hand and capable of readily, accurately, and directly determining several characteristics of light such as the intensity of light falling on a subject, the color temperature of a light source, and the spectral characteristics of light emitted from the light source. The invention contemplates a compound meter having a single photoelectric or light responsive cell and a plurality of light-modifying elements protectively enclosed with a casing and selectively movable into the path of light being examined impinging on the cell.

This application is a continuation-in-part of our copending application Serial No. 320,922 filed November 17, 1952, entitled "Compound Photometric Device" now abandoned in favor of the present application.

Rapid measurement of various light characteristics by direct means and by a single instrument has become increasingly important both to professional photographers and illumination engineers and to amateur photographers in order to achieve accurate photographic rendition of a subject under variant light conditions. Various factors mentioned briefly below include, firstly, measurement of the intensity of light illumination both as to incident and reflected light. Incident light refers to light directly falling upon the subject, while reflected light refers to light reflected from the subject.

Secondly, in color photography, color temperature must be determined in addition to the intensity of the light because same intensities of illumination may have widely variant color temperatures. Color temperature is measured in degrees Kelvin which is the temperature to which a "black body" must be raised to have the same color as the light in question. Color sensitive film is designed for use under light conditions having specified color temperature and therefore the color temperature of the light source becomes very important in order to produce true color renditions on a particular film. Once color temperatures is determined, a particular color sensitive film may be selected or various methods may be employed to compensate for variation in color temperature between that for which the film is designed and that of the light source being used. Such various methods may include the proper selection of color filters, supplementing the light source by adding additional selected light, and by modifying the voltage of the particular light source.

Thirdly, when a light source emits light in the form of a discontinuous spectrum band, determination of spectral characteristics of the light source may be necessary; that is, distribution and energy of specific wave length bands between the ends of the visible spectrum must be known and measured. For example, in light sources emitting a discontinuous spectrum band, the amount of energy emitted by a particular wave length band (such as green) must be determined to insure that the spectral composition of the light is within acceptable tolerances of a selected color sensitive film.

The light characteristics mentioned above, namely, intensity, color temperature, and spectral characteristics must be quickly and accurately determined because of constantly changing light conditions. In order to quickly determine such characteristics, a direct reading is essential. The use of computing charts or tables are cumbersome and to be avoided.

The primary object of this invention is to design and provide a single portable compound direct reading light measuring meter for illumination engineering and for the photographic arts to measure the several characteristics of light mentioned above.

An object of this invention is to design and provide such a compound meter which is small, compact, inexpensive to manufacture, and which may be readily handled.

Another object of this invention is to design and provide a compound meter wherein a plurality of light-modifying elements are operably carried internally of the meter housing, protected from the accumulation of foreign matter and dirt and from damage while the meter is being transported, handled, and used.

A further object of this invention is to design and provide a compound meter wherein readily observable scales correlated to selected light-modifying elements are provided for direct reading of the selected characteristics of the light to be measured and are automatically movable into observable position upon operable positioning of the associated light-modifying element.

Still another object of this invention is to design and provide a compound light-measuring meter wherein novel provide a compound light-measuring meter wherein novel light-limiting or shutter means are provided for adjusting the amount of light admitted to the light responsive cell and wherein said light-limiting means may be automatically moved into fully open position when measuring the intensity of illumination of a light source.

The invention further contemplates a compound light-measuring meter wherein the housing or casing means and the several elements of the meter are assembled in novel manner.

The invention contemplates an exemplary embodiment wherein a casing means includes a peripheral wall provided with a light-admitting port and wherein a light-collecting member and a grid member are selectively movable along the wall into operative position over said port.

A still further object of this invention is to disclose a photometric device having a light-admitting port in a peripheral wall of the casing means and provided with light-modifying elements rotatable within the casing means about an axis perpendicular to the path of light and admitted through the port.

Generally speaking, the invention relates to a compound light meter having a cup-shaped hollow casing means adapted to be normally horizontally held in the palm of the hand and provided with a normally vertically disposed cylindrical wall having a light-admitting port. Nested concentrically within the casing means is a selectively rotatable ring-type carrier member provided with a plurality of circumferentially spaced openings in which may be mounted a plurality of selected light-modifying elements. The ring-type carrier member is connected to an external turning means by an annular, flat scale-carrying member rotatable with the carrier member. The scales on said scale-carrying member are arranged in correlation with the light-modifying elements carried by the carrier member. A window in a cover for the casing means affords observation of said scales. A light-responsive cell is positioned within the ring-type carrier member in alignment with light-admitting port and when light-modifying elements are selectively positioned therebetween, the response to light impinging upon said cell will be indicated by a meter having an index movable over scales positioned beneath said window. The light-admitting port is provided with novel light-limiting or shutter means for controlling the amount of light admitted to the cell.

Other objects and advantages of this invention will be readily apparent from the following description of the drawings in which an exemplary embodiment of this invention is illustrated.

In the drawings:

Fig. 1 is a perspective view of a compound meter embodying this invention.

Fig. 2 is a transverse sectional view taken in a plane passing through a diameter which bisects the light-admitting port.

Fig. 3 is a sectional view taken in the horizontal plane indicated by line III—III of Fig. 2.

Fig. 4 is a fragmentary top view of Fig. 1 partly in section.

Fig. 5 is a vertical transverse sectional view taken in the plane indicated by line V—V of Fig. 4.

Fig. 6 is a fragmentary perspective view of the novel shutter elements employed for light-limiting means in this invention.

Fig. 10 is a perspective view of a different embodiment of this invention.

Fig. 11 is a sectional view taken in a vertical plane longitudinally bisecting the device.

Fig. 14 is a fragmentary sectional view taken in the plane indicated by line XIV—XIV of Fig. 12.

Figure 7:
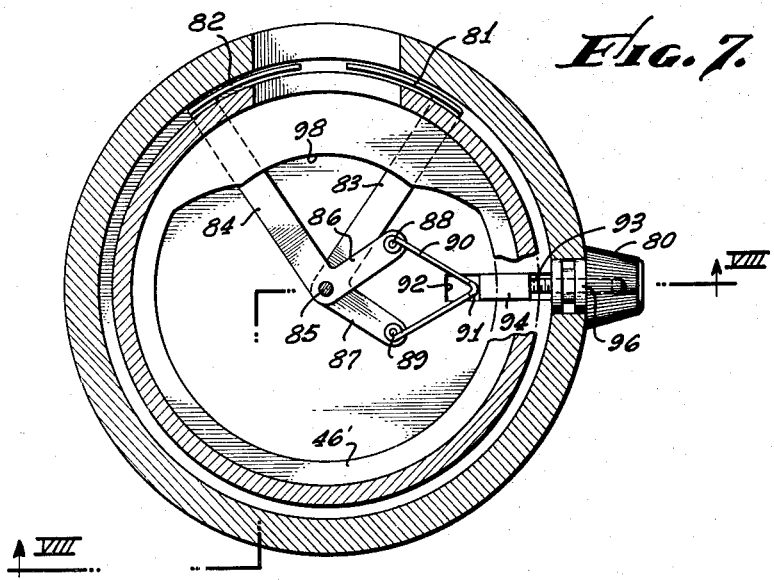
Fig. 7 is a top plan view of a different modification of the light-limiting means employed in a meter embodying this invention.

Referring to the embodiment of this invention shown in Figs. 1 to 6, the compound meter generally indicated at 10 is of small, compact form adapted to be held horizontally in the palm of the hand when in use. It should be particularly noted that the meter 10 has a clean, uninterrupted, exterior design and substantially all of the operating elements are contained inside the meter where they are protected from damage, dirt and dust.

The compound meter 10 comprises an outer hollow housing or casing means 11 of generally cup-shaped form and having an open end. The casing means is provided with a bottom circular wall 12 integrally formed with a circumferential cylindrical upstanding peripheral or side wall 13. The bottom wall may be provided with an annular groove 14 adjacent the inner circumference of side wall 13, said groove 14 receiving and positioning an annular insert ring 15 concentrically with the side wall 13. The insert ring 15 comprises a cylindrical wall having an outwardly directed top circumferential lip 16 forming with a bottom inner shoulder 17 on the inner surface of the wall 13, a continuous circular passageway 18. The circular passageway 18 is adapted to receive and guide shutter means generally indicated at 19 as later described.

A light-admitting port 21 of rectangular form may be provided in wall 13 and aligned light-admitting port 22 is likewise provided in the insert ring 15, the latter port being of virtually the same size and configuration as the port 21.

The bottom wall 12 carries a pair of upstanding, spaced posts 23, said posts being secured to the inner surface of the bottom wall in any suitable manner as by screws 24. The posts 23 are disposed slightly to one side of a diameter of the casing means. The top faces of said posts lie in the same plane which is slightly below the plane of the top edge of the side wall 13 of the casing means.

Means for covering the open end of the casing means 11 may comprise a circular cover 25 having a depending circumferential lip 26 aligned with the side wall 13. The bottom edge face of lip 26 is held in closely spaced relation, as at 27, to the top edge face of the side wall by a pair of spaced, depending bosses 28 formed on the inner surface of cover 25 in alignment with and supported from the upstanding posts 23. The cover 25 may be secured to the upstanding posts 23 as by screws 29. The cover 25 includes ring sector-shaped window 30 disposed above and in alignment with the light-admitting ports 21 and 22.

A suitable microammeter, milliammeter, microvoltmeter or millivoltmeter, generally indicated at 32, is carried within the casing means between posts 23 and may be held as by securing plate 33 extending across the top of the meter and between the respective associated posts 23 and bosses 28 so that screws 29 may extend through plate 33 and thus securely hold the meter in assembled position. The meter 32 is provided with an index or needle 34 which extends below the inner surface of the cover 25 and the window 30 so that the index may be observed.

A rectangular light-responsive cell generally indicated at 36 is carried on the bottom wall 12 in alignment with the light-admitting ports 21 and 22. The cell 36 may be supported in any suitable manner by a frame means generally indicated at 36 which may be secured as by screws 38 to the bottom wall 12 of the casing means. The cell is electrically connected to the meter in well-known manner, such connection not being shown for purposes of clarity. The cell 36 may comprise any suitable photoelectric cell as for example, a photo-conductive, semi-conducting, or barrier layer selenium or copper oxide photovoltaic, photronic or other types.

Means for selectively interposing a plurality of light-modifying elements between the light-admitting ports 21, 22 and the cell 36 within the casing means may comprise a hollow cylindrical carrier member 40 concentrically nested within insert ring 15. The cylindrical member 40 includes a plurality of openings 41 arranged in circumferentially spaced relationship, each of said openings being adapted to carry a selected light-modifying element. The light-modifying elements may include a grid 41a, a red filter 41b, a blue filter 41c and a green filter 41d. The remaining opening 41 may be left open to cooperate with a light collecting member as later described. The cylindrical member 40 includes an outer cylindrical surface 42 having centrally formed thereon between openings 41 outwardly directed bearing projections 43, said projections 43 having curved outer face portions 44 rotatably and slidably contacting the inner cylindrical surface 45 of the insert ring. The slidable contact of projections 43 serves to maintain carrier member 40 in concentric rotatable relationship to the side wall of the casing means.

To further facilitate the maintenance of the concentric relationship of the carrier member 40 within the casing means, the bottom edge face of member 40 may be provided with an annular flat ring 46 having an outer circumferential edge contacting as at 47 the inner cylindrical surface 45 of the insert ring below the contact of the bearing projections 43. The ring 46 may be made of any suitable metal such as Phosphor bronze and may be secured to member 40 in any suitable manner as by screws (not shown).

Means for rotating the carrier member 40 includes an external annular turning or actuator member 50 carrying a flat scale-carrying ring 51, said ring 51 extending between the space 27 between the depending flange 26 and the side wall 13 and extending radially inwardly for connection, as by screws, to the top circumferential edge face of the carrier member 40. The actuator member 50 includes a radially, inwardly directed lip 53 adapted to partially overlie the top circumferential margin of the cover 25.

The scale-carrying ring 51 may be of any suitable width so as to extend below the opening of the window 30. The scale-carrying ring 51 may be made of any suitable metal such as Phosphor bronze and includes an upstanding peripheral flange 54 which serves to connect the ring 51 with the actuator member 50. It should be noted that the scale-carrying ring 51 through slidable flat bearing contact with the top edge faces of the side wall 13 and insert ring 15 thus supports the carrier member 40 within the casing means so that turning of actuator member 50 will rotate the carrier member 40.

The scale-carrying ring 51 may be provided on its top surface with a plurality of selected scales exemplarily illustrated in Fig. 9, said scales being correlated in position and in marking to respective openings 41 immediately therebelow and to the light-modifying elements carried by the openings 41 and more particularly described later.

Means for accurately positioning the light-modifying elements in alignment with the light-admitting ports 21 and 22 may be provided by a spring-biased bullet-type catch 58 carried in a bore 59 provided in side wall 13. The catch 58 includes a depending stem 60 serving as a guide for a coil spring 61 carried within the bore 59 and serving to bias the catch 58 upwardly above the plane of the top edge of the side wall 13. The scale-carrying ring 51 may be provided with a plurality of circumferentially spaced holes 62 correlated to openings 41 lying in a circle above side wall 13 so that as the actuator member 50 is turned, the catch 58 will snap into an opening 62 to indicate that a selected light-modifying element is accurately positioned in alignment with the cell 36 and ports 21 and 22.

Means for limiting the light falling upon the cell and admitted through the ports 21, 22, may comprise a pair of curved band or ribbon-type shutter elements 64 and 65. Each shutter element 64 and 65 is slidably accommodated within passageway 18 on each side of ports 21, 22. The opposed ends of the element 64 and 65 at the ports 21 and 22 may be serrated as at 66 in complementary form so as to finely adjust and accurately control the amount of light admitted to the cell 36.

The opposite ends of elements 64 and 65 are provided with narrow overlapping rack portions 67 and 68, said portions being provided with opposed rack teeth 69 and 70 respectively. The rack teeth 69 and 70 are engaged by a spur gear 71 which is carried on a shaft 72 extending outwardly through an opening 73 in the side wall of the casing diametrically opposite to the light-admitting ports 21 and 22. An actuating knob 74 is carried by the shaft for turning of the gear 71 so as to cause the shutter elements 64 and 65 to slide in the circular passageway 18 for opening and closing the ports 21 and 22. The shaft 72 may be supported as by partially conical bearing 75 in a corresponding recess formed in the insert ring 15. A closure washer 76 may also be provided to mount the shaft in opening 73.

The shutter elements 64 and 65 may be biased to open position by a V spring 77 secured at its apex by a suitable screw to the bottom surface of the cover 25. The ends 78 of the V spring may be connected to top edge portions of the shutter elements as by bending the spring extremity downwardly into notches 79 provided therefor in the shutter elements. The top margin of the insert ring may be cut away in the vicinity of the light-admitting ports 21, 22 so as to accommodate without interference the ends 78 of the V spring below the scale-carrying ring. It is understood, of course, that the shutter elements may be manually operated without a spring if desired and other suitable means may be used to connect ends of the spring to the shutter elements.

Figure 8:
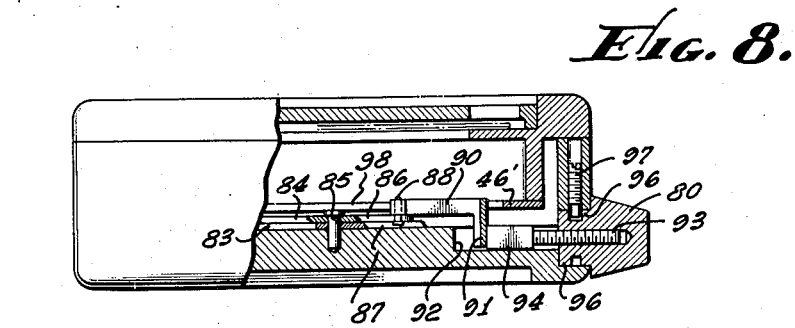
Fig. 8 is a fragmentary sectional view taken in the plane indicated by line VIII—VIII of Fig. 7.

A modification of the shutter or light-limiting means is illustrated in Figs. 7 and 8. The modification differs from that just described in that a turning knob 80 is mounted at one side of the casing means with respect to the light-admitting port and in that only segments 81 and 82 of curved shutter elements are used for limiting the light passing through the light-admitting ports.

The curved segmental shutter elements 81 and 82 may be slidably operable within a curved passageway, which may be formed in the manner of passageway 18 as in the prior modification. Each curved shutter element 81 and 82 is carried by a bell crank arm 83 and 84 respectively which are pivoted from the center of the bottom wall as at 85 by a suitable screw. Each arm 83 and 84 includes a right angle portion 86 and 87, the ends of which are connected as at 88 and 89, to opposite ends of a V type inwardly biased spring member 90. The spring member 90 may have the apex of the V formed with a depending portion 91 extended downwardly for reception within a groove 92 of rectangular cross section in the bottom wall of the casing means. A screw 93 provided with a headed end 94 having a square or rectangular cross section is slidably accommodated within groove 92 and is adapted to press against the depending portion 91 of the spring. The screw 93 is reciprocally movable in groove 92 by means of a turning knob 80 connected to the outer end of the screw and threadedly carried in a bushing 96 received within the side wall of the casing means, and held therein as by set screw 97. Thus as knob 80 is rotated, screw 93 is advanced or retracted in groove 92 and the spring 90 is urged inwardly or outwardly so as to actuate arms 83 and 85 as by a scissors movement.

In this modification it should be noted that an annular ring 46' is provided with an inner circumferential edge having a cam edge portion 98. The cam edge portion 98 is adapted to bear against depending portion 91 of spring 90 so as to urge the spring inwardly when the cam edge is moved thereagainst for causing positive opening of the shutter elements 81 and 82 when selected light-modifying elements are positioned in alignment with the light-admitting port. The cam edge portion 98 is associated with openings in the carrier member which are used for determining exposure characteristics of the light being examined. Thus full opening of the light-admitting ports 21 and 22 is automatically accomplished when the actuator member 50 is turned to secure an exposure reading.

It may be desirable in order to make an exposure reading of incident light characteristics to removably mount in the light-admitting port, a partially spherical or convex light-collecting member. The light-collecting member may preferably be made of any suitable translucent, frosty, milky, or white material such as a thin cellulosic or plastic material. Other means, as shown in the embodiment of Figs. 10–13, for removably mounting a light-collecting member over the light-admitting port may include a pair of parallel grooves carried by the side wall of the casing means adjacent to the light-admitting port so that a light-collecting member mounted therein may be quickly and easily slidably moved over the light-admitting port in order to secure an exposure reading of incident light characteristics.

Figure 9:
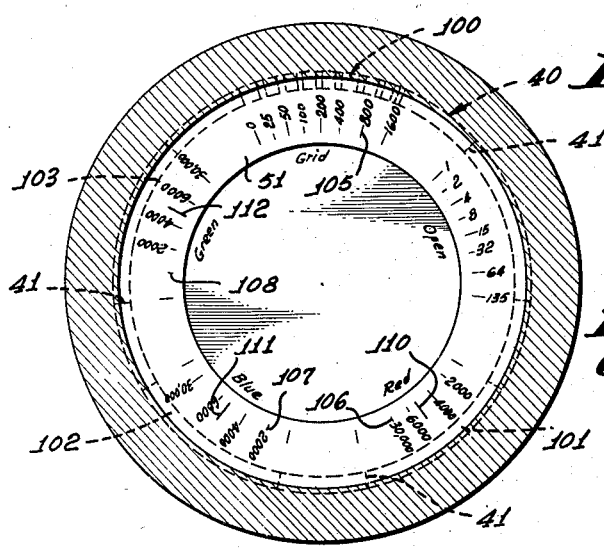
Fig. 9 is a top plan view of the scale-carrying ring employed in a meter embodying this invention and illustrating various light-modifying elements correlated and associated with respective scales.
Figure 12:
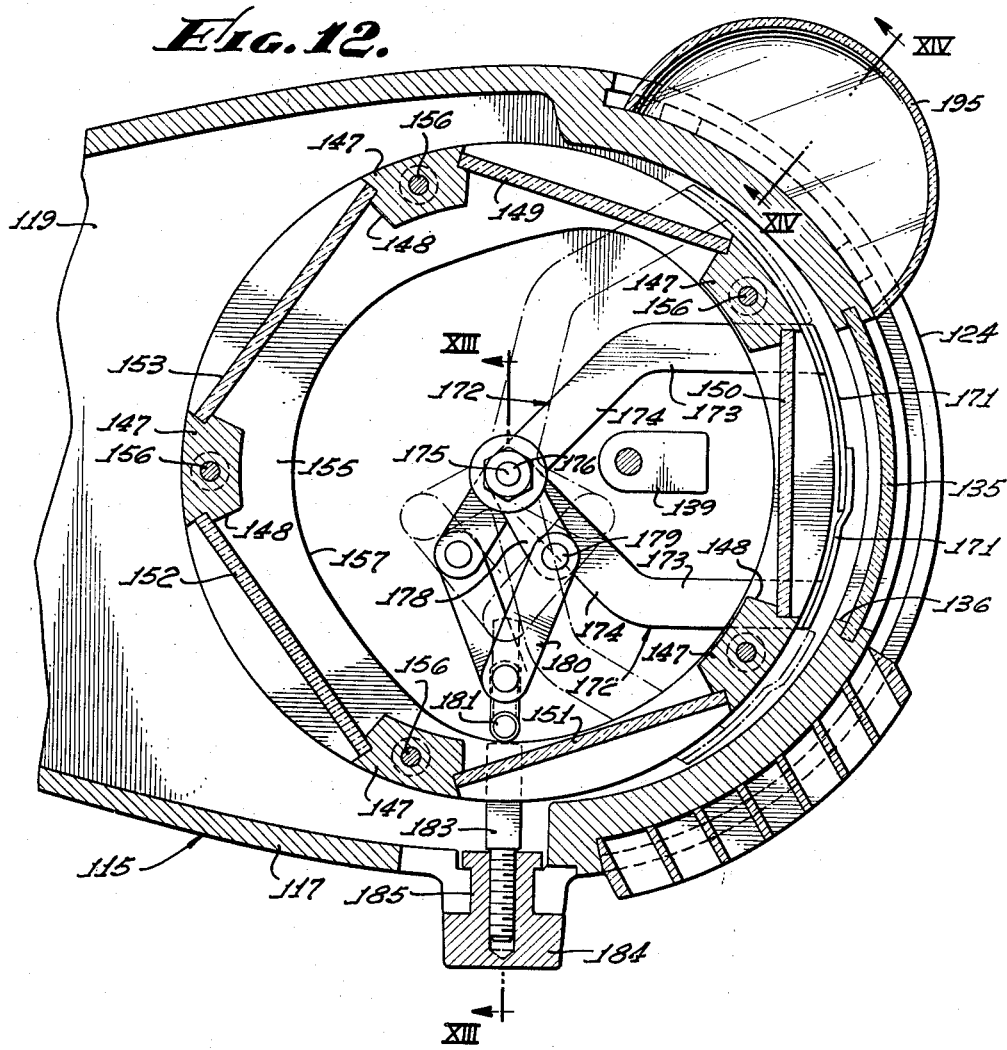
Fig. 12 is a fragmentary sectional view taken in a horizontal transverse plane indicated by line XII—XII of Fig. 11.

As illustrated in Fig. 9, the carrier member 40 may be provided with a plurality of light-modifying elements carried in spaced openings 41. The light-modifying elements may include a grid 100, a red filter 101, a blue filter 102 and a green filter 103. The remaining opening 40 in the carrier member 40 may be left open in order to cooperate with the light-collecting member described above. The scale-carrying ring 51 is provided with a plurality of scales each having indicia thereon correlated with a selected light-modifying element to determine selected light characteristics. For example, grid 100 may be correlated with a scale 105, the red filter correlated with a scale 106, the blue filter with a scale 107, and a green filter with a scale 108. A selected light-modifying element is moved in alignment with the light-admitting ports 21, 22 and the cell, the selected scale is likewise moved beneath the window for a direct reading of the particular light characteristics sought.

The grid or reticulated member 100 is calibrated so that the amount of light transmitted through the perforations thereof with relation to the light sensitive area of the cell is accurately known. The blue, red and green color filters may be of well-known form and make. Other color filters may be substituted for these color filters, if desired.

In operation, the compound meter 10 may be held in the palm of the hand and the actuator member 50 rotated by the other hand in order to position the selected light-modifying element carried by the carrier member 40 in alignment with the light-admitting ports 21 and 22, said light-admitting port being pointed toward the light source being examined. A number of different light measurements may thus be quickly taken by moving selected filters into position before the light-responsive cell so that proper exposure and proper filters may be selected for exposing a particular type of film being used. Such rapid determination of light characteristics is especially important in outdoor photography where the character of the light is subject to constant change.

When it is desired to measure incident light or the amount of light falling upon the subject under examination, the actuator member 50 may be rotated in suitable direction until the opening 41, which does not carry any light-modifying element, is positioned in alignment with the light-admitting port. The light-collecting member may then be inserted in the light-admitting port and a reading taken on the scale 109 which has been automatically moved beneath the window 30. The shutter elements should be in fully open position and in the modification shown in Figs. 7 and 8, this requirement is automatically accomplished by movement of cam edge 98 against the depending portion 91 of the spring so as to fully separate the shutter elements 81, 82 and completely open the light-admitting port.

Substantially the same procedure is followed when it is desired to determine high level illumination incident light falling upon the subject under examination. In this instance the light-transmitting member or grid 100 is rotated into operative position in front of the light-responsive cell. The shutter elements should again be in fully open position. A direct reading may be obtained beneath the window upon rotation of the carrier member 40.

When it is desired to measure the color temperature of light being examined, the carrier member may be rotated so as to place the red filter 101 in operative position in front of the light-responsive cell. The cutter elements are then adjusted by the actuating knob to modify the amount of light admitted to the cell until the index needle 34 is positioned above a reference point 110 at the center of scale 106. The red filter 101 may then be moved out of alignment with the port 21, 22 and the selected blue filter 102 may be moved into operative position with respect to the cell. A change in position of the index needle 34 to indicia on the scale 107 when the blue filter is positioned in front of the light-responsive cell, indicates the color temperature of the light being examined in degrees Kelvin.

When it is desired to examine the spectral characteristics of a light source such as a vapor discharge lamp having a discontinuous line spectrum, and in particular, a specific wave length band, as for example green, the steps in obtaining the color temperature as described in the above paragraph are first followed, that is, a red filter is first placed in front of the light-responsive cell, the light is then limited by the light-limiting means until the needle is aligned with the reference point on the correlated scale and then the blue filter is moved into position with respect to the light-admitting port and the needle then indicates on the scale 107 correlated with the blue filter, the color temperature of the light being examined. After the color temperature is thus obtained, the carrier member 40 may be rotated so that the selected green filter 103 is operatively positioned in front of the cell and at the same time scale 108 is moved into rotatable position beneath the window 30.

It will be noted that scale 107 and 108 are provided with reference points 111 and 112 at central points on the scale. When the green filter 103 is thus placed in operative position, any relative change in the position of the index needle caused thereby is indicative of the spectral characteristics of the specific wave length band being examined. If the needle varies its position from that obtained on the color temperature reading, the amount of green light in the discontinuous line spectrum of the light source being examined is different than that needed to give a properly balanced color reproduction on color film balanced for that particular color temperature.

It is obvious that other specific wave length bands of the discontinuous line spectrum may be analyzed by the provision of suitable scales on the scale-carrying ring and the insertion of suitable pre-selected filters in the openings 41 on the carrier member 40. The filter cell combination may be balanced to correspond to the sensitivities of the three layers of a color film thus reading directly whether a spectrally continuous or discontinuous light source has the proper distribution for use with that film and the scales can be calibrated to read what correcting filters, if any, need to be used; or the filter cell combinations may be such that they correspond to the three color sensitivities of the average human eye and the meter scales read directly in relative tri-stimulus coordinates XYZ. Although only five openings 41 are shown in the carrier member 40, it is obvious that a greater number of openings of different size may be readily formed therein to permit the carrying of a greater number of light-modifying elements; likewise the scale-carrying ring may be provided with a greater number of scales on its face to correspond with the increased number of light-modifying elements.

It is important to note that the concentric nesting arrangement of this side wall of the casing means, the insert ring, the carrier member, and the shutter elements provides a very compact, simple, multi-purpose photometer. Furthermore, the light-modifying elements are carried within the casing means and are not subject to damage, to dirt, or to accidental displacement. The curved shutter elements operable within a circular passageway provided between the side wall of the casing means and the insert ring affords a novel method of limiting the light admitted through the port provided in a side wall.

In the embodiment of this invention shown in Figs. 10 to 15 inclusive the operative relationship of the light-admitting port, the light-responsive cell, the light-modifying elements and the shutter means is substantially the same although the construction of the compound meter is somewhat different.

In Figs. 10 and 11 a hollow casing means generally indicated at 115 may be made of an upper case portion 116 and a bottom case portion 117, said portions providing respectively top and bottom walls 118 and 119. Walls 118 and 119 are provided with peripheral flanges 120 and 121 whose edges meet as at 112 when the case portions are assembled, said flanges 120 and 121 forming a peripheral wall 123. The configuration of the case means provides a semicircular front section 124 and a rear section 125 tapering rearwardly from a transverse diameter defining said semicircular front section. The top wall 118 may be provided with an upstanding smoothly curved transversely extending thumb positioning portion 126 adjacent the end of the rear section. The convex surface of thumb positioning portion smoothly merges with the top surface of the top wall 118 through a concave recess 127 which comfortably accepts and positions a thumb.

At the rear section 125, case portions 116 and 117 may be secured together by a pair of transversely spaced opposed internal meeting posts 128 and 129 respectively, said posts being provided with aligned bores to receive screw bolts 130. At front section 124, peripheral flanges 120 and 121 may be provided with overlapping side-securing lugs 131 and 132 respectively, said lugs receiving securing screws 133.

The front section 124 of the casing means is provided with a central front window 135 and a light-admitting port 136 to admit light along a path parallel to the longitudinal axis of the casing means.

Positioned within the front section of casing means in said light path is a light responsive photoelectric cell 137 mounted on an L-shaped mounting bracket 138 secured to an upstanding boss 139 carried by bottom wall 119. Cell 137 may be of suitable type as described for the photoelectric cell in the preceding embodiment of this invention. Cell 137 may be operatively connected by electrical leads (not shown) to a suitable microammeter 140 secured within rear section 125 to an internal mounting boss 141 on top wall 118 disposed between posts 128 and 129. An index pointer or needle 142 is pivotally connected to the microammeter and extends beneath a window 143 in the shape of a circular segment provided in top wall 118.

Means for selectively interposing a plurality of light-modifying elements in said light path may comprise a carrier member 145 including centrally depressed circular disc 146 provided with integral depending circumferentially spaced arcuate segments or fingers 147, said spaced fingers defining a plurality of openings 148 therebetween. In openings 148 may be carried selected light-modifying elements such as a red color filter 149, a blue color filter 150, a green color filter 151 and the remaining exemplary windows 152 and 153 may be open. Secured to the bottom faces of fingers 147 may be a thin generally annular cam plate 155 secured as by screw bolts 156, said cam plate providing an internal cam edge 157 for cooperation with light-limiting means as hereinafter described.

The centrally depressed disc 146 may be provided with an upstanding axial hub portion 159 which extends through a central port 160 in top wall 118. The axis of said port may coincide with the axis of the semicircular front section 124 and is perpendicular to said light path. Secured to the outer end of hub portion 159 is an external circular actuator member 161 provided with a serrated or castellated outer periphery 162 to facilitate grasping thereof. It may be noted that the central circular depression of top wall 118 partially accommodates actuator member 161. An annular seal 163 may be mounted in the bottom face of the actuator member 161 to bear against the top surface of top wall 118 to act as a barrier against dirt, moisture and the like.

The carrier member 145 may be provided with a plurality of circularly spaced dimples or depressions 165, each aligned with an opening 148. Top wall 118 is provided with a spring-biased positioning ball 166 partially received in a bore 167 provided in wall 118. Positioning ball 166 snaps into a selected dimple 165 to indicate alignment and positioning of a selected light-modifying element in the light path.

The disc 146 carries an annular scale means 169 in an annular recess in the top outer circumferential margin thereof. Scale means 169 is secured to disc 146, is simultaneously movable therewith, and is movably positionable and observable beneath window 143. The scale means may include a thin flat annular metal member upon which is imprinted selected scale indicia correlated to a particular light-modifying element with which it is operatively associated. Scale-carrying means 169 may contain scales as illustrated in Fig. 9.

Figure 13:
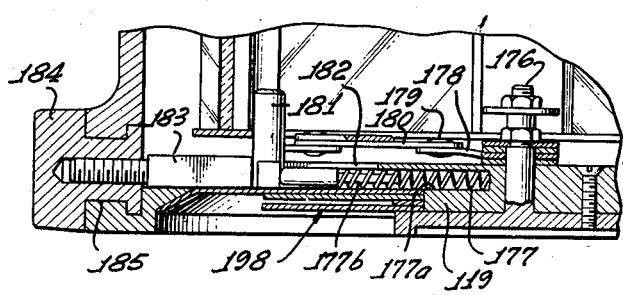
Fig. 13 is a fragmentary sectional view taken in the plane indicated by line XIII—XIII of Fig. 12.

Light-limiting means for port 136 may be mounted within the casing means on bottom wall 119 and may include a pair of upstanding curvilinear shutter elements 171 adapted to close with overlapping adjacent portions as shown in Fig. 13. Shutter elements 171 are positioned behind front window 135 and are movable along the internal face of peripheral wall 123 of the casing means. Each shutter element 171 is carried at one end of a lever 172 of flat metal stock which extends along and parallel to bottom wall 119. Levers 172 include forwardly directed parallel portions 173 at opposite sides of photo cell 137 positioned therebetween and include converging inturned diagonal portions 174 which are pivotally interconnected and mounted at a common axis 175. A pivot pin 176 defining axis 175 extends through bottom wall 119 and may be in alignment with the axis of rotation of carrier member 145.

Each lever 172 also includes a bell crank arm 178 which may be pivotally connected at its end as at 179 to an actuating link 180 pivotally connected at its other end to an upright movable pin 181. Movable pin 181 is received at its bottom portion in a transversely disposed groove 182 provided in bottom wall 119. Pin 181 is in pressure engagement with a rectangular end of a nonrotatable bolt 183, the other end of said bolt being threaded in a rotatable shutter actuator knob 184 mounted for rotation as at 185 in the peripheral wall 123 as in the prior embodiment.

The levers 172 may be biased inwardly toward each other into shutter closed position by a coil spring 177 positioned in a bore 177a in the bottom wall 119. A pin 177b is seated on said spring and contacts the upright movable pin 181 opposite to the end of bolt 183. An actuator knob 184 is turned, bolt 183 and upright pin 181 move transversely. Inward movement of pin 181 will cause links 180 to further separate to cause bell crank arms 178 to expand and to thereby move through levers 172 the shutter elements 171 into open position. Shutter elements 171 are biased to closed position by the spring 177 as movable pin 181 moves outwardly.

Means to automatically open the shutter elements 171 upon positioning selected light-modifying elements in the light path includes the cam edge 157 carried by the carrier means 145. The cam edge 157 is configured to press against the upper portion of movable pin 181 and, when windows 152 and 153 are positioned opposite the light-admitting port, the pin 181 is moved inwardly to its maximum inward position so as to fully open the shutter elements upon rotation of actuator member 161.

It should be noted that the peripheral wall 123 in the front section 124 may be of thick section and is provided with a part circular front facing recess 190 extending thereacross and defined by peripheral flanges 120, 121 and parallel opposed recess walls 191. Recess walls 191 may be provided with opposed part circular grooves 192 which may slidably receive correspondingly curved guide lugs 193 provided on a mounting frame 194 for each of light-collecting member 195 and reticulated grid member 196. The collecting member 195 and the grid member 196 may be positioned at opposite ends of the recess 190 when color readings are being taken. Each member 194 and 196 may be selectively positioned in front of the light-admitting port when an exposure window is positioned opposite to said port for reading exposure or intensity of illumination. The light-collecting member 195 may be of elongated semiovoidal shape and may be formed of a translucent material such as described in the prior embodiment. The grid member 196 may be provided with suitably spaced openings of selected area in order to admit only a selected amount of reflected light to said cell.

The bottom wall 119 may be provided with a plurality of index exposure computer plates generally indicated at 198. Said plates may be conveniently mounted in the central depression formed in the outer face of the bottom wall, such computer plates being well known in the art and are not described in detail because they do not coact with the operative parts of the meter.

Operation of the compound photometric device described above is virtually the same as that described in the prior embodiment and for brevity, a description of the operation is not repeated. It should be noted that the meter may be conveniently positioned in the palm of the hand and that the positioning means and recess for the thumb of the hand faciltitates holding thereof in a steady position. In this position the external actuator knob above the top wall of the casing may be readily manipulated and similarly the actuator on the peripheral wall of the casing may be readily turned. The admitting of light through a port in the peripheral wall along a path which is perpendicular to the axis of rotation of the carrier means for the light-modifying elements provides for a compact simply constructed photometric device which can be relatively inexpensively manufactured.

I will be obvious to those skilled in the art that the multi-purpose photometer disclosed by this invention permits the direct determination of a plurality of specific characteristics of light being examined in a minimum of time and yet provides an accurate easily read measurement of the specific light characteristics sought. The instrument is of compact simple construction, clean exterior design, and is inexpensive because it utilizes a single photo-electric cell.

It will be readily understood that the modifications of the invention described above is illustrative only and that modifications and changes thereto coming within the spirit of this invention are intended to be limited only by the scope of the appended claims.

We claim:

1. In a portable compact compound meter for measuring characteristics of a light source and including operably associated meter, index, and light responsive cell carried within the meter, the combination of: a hollow casing means having a bottom wall, a side wall, and a top opening; means covering said top opening and having a window over said index; means forming a light-admitting port in said side wall in alignment with said cell and defining a light path into the casing means; means for selectively interposing a plurality of light-modifying elements in said light path comprising, a carrier means within the casing means rotatable about an axis perpendicular to the light path and having a plurality of circumferentially spaced openings therein adapted to carry selected light-modifying elements, and means for rotating the carrier means including an actuating member externally of the covering means and an annular scale-carrying member connected with the actuating member and the carrier means and lying beneath said window for movement simultaneouly with the carrier means; and light limiting means for said port comprising curvilinear shutter elements movable to open and close said port and carried at said side wall.

2. In a portable compact meter for measuring characteristics of a light source and including operably associated meter, index, and light responsive cell carried within the meter, the combination of: a hollow casing means including a side wall, a bottom wall and a top cover means opposite the bottom wall and provided with a window over said index; means providing a light admitting port in said side wall in alignment with said cell and defining a light path into the casing means; means for selectively interposing a plurality of light-modifying elements in said light path comprising a carrier means within the casing means rotatable about an axis perpendicular to the light path and having a plurality of circumferentially spaced openings therein adapted to carry selected light-modifying elements; means to rotate the carrier means about said axis including an actuating member externally of the covering means and connected to the carrier means; an annular scale-carrying means connected with the carrier means to move simultaneously with the carrier means and observable beneath the window; and light-limiting means mounted in the casing means and including shutter elements movable along the side wall to open and close said port.

3. In a portable compact meter for measuring characteristics of a light source and including operably associated meter, index, and light-responsive cell carried within the meter, the combination of: a hollow casing means including a peripheral wall and top and bottom walls, said top wall being provided with a window over said index; means providing a light-admitting port in said peripheral wall in alignment with said cell and defining a light path into the casing means; means for selectively interposing a plurality of light-modifying elements in said light path comprising a carrier means within the casing means rotatable about an axis perpendicular to the light path and having a plurality of sequentially spaced openings therein adapted to carry selected light-modifying elements; means to rotate the carrier means about said axis including an actuating member externally of the casing means and connected to the carrier means; a scale-carrying means connected with the carrier means to move simultaneously with the carrier means and observable beneath the window; and light-limiting means mounted in the casing means and including shutter elements movable along the peripheral wall to open and close the port.

4. A meter as stated in claim 3 wherein said casing means is provided with a front semicircular section.

5. A meter as stated in claim 3 wherein said shutter elements are curvilinear.

6. A meter as stated in claim 5 wherein said shutter elements are movable about the axis of said carrier means.

7. A meter as stated in claim 3 including a lever arm connected to each shutter element, said lever arms being pivotally connected to said casing means.

8. A meter as stated in claim 7 including a shutter-actuating member extending from said peripheral wall and means connecting said shutter-actuating member to said lever arms.

9. A meter as stated in claim 8 wherein said means connecting said shutter-actuating member to said lever arms include an element movable towards and away from the pivotal connection of said lever arms, and means connecting said element to said lever arms.

10. A meter as stated in claim 9 including cam means connected to said carrier means and cooperably engageable with said movable element to automatically fully open said light-limiting means in selected positions of said carrier means.

11. In a portable compact meter for measuring characteristics of a light source and including operably associated meter, index, and light responsive cell carried within the meter, the combination of: a hollow casing means including a side wall, a bottom wall and a top cover means opposite the bottom wall and provided with a window over said index; means providing a light-admitting port in said side wall in alignment with said cell and defining a light path into the casing means; means for selectively interposing a plurality of light-modifying elements in said light path comprising a carrier means within the casing means rotatable about an axis perpendicular to the light path and having a plurality of circumferentially spaced openings therein adapted to carry selected light-modifying elements; means to rotate the carrier means about said axis including an actuating member externally of the covering means and connected with the carrier means; an annular scale-carrying means associated with the carrier means to move simultaneously with the carrier means and observable beneath the window;

light-limiting means including shutter elements carried by said side wall and movable to open and close said port; and means to fully open said shutter elements at a selected position of said actuating member including lever means connected to said shutter elements, spring means biasing the lever means to close said shutter elements, and cam means connected to and movable with said carrier means to actuate said lever means to open said shutter elements.

12. A meter as stated in claim 11 wherein said carrier means carries a cam edge and said light-limiting means includes a shutter element actuating member engaged by said cam edge for automatically, fully opening said light-admitting port.

13. In a compound meter for measuring characteristics of a light source and including operably associated meter, index, and light responsive cell enclosed therewithin, the combination of: a hollow cylindrical casing means having a bottom wall, a side wall with an inner cylindrical surface, and a top opening; means covering said top opening and having a window over said index; means forming a light-admitting port in said side wall in alignment with said cell and defining a light path extending toward and perpendicular to the axis of the casing means; means for selectively interposing a plurality of light-modifying elements in said light path comprising a carrier means within the casing means rotatable about said axis and having outer face portions rotatably engaging said inner surface and having a plurality of circumferentially spaced openings therein to carry the light-modifying elements, and means for rotating the carrier means including an actuating member externally of the covering means and an annular scale-carrying member connecting the actuating member and the carrier means and lying beneath said window; said actuating member and scale-carrying member being coaxial; and light limiting means for said port comprising shutter elements movable to open and close said port and carried at said side wall.

14. A meter as defined in claim 13 wherein the light-limiting means includes a curved passageway in the side wall on opposite sides of the port and curved shutter elements carried in said passageways and movable over said port.

15. A meter as defined in claim 13 wherein the light-limiting means includes a pair of virtually semi-circular bands movable along their axes to open and close said port, end portions of each band having opposed rack teeth, and a rotatable pinion engaging said rack teeth.

16. A meter as defined in claim 13 wherein the scale member carries a cam edge and said light-limiting means includes a shutter element actuating member engaged by said cam edge for automatically, fully opening said light-admitting port.

17. In a compound meter for measuring characteristics of a light source and including operably associated meter, index, said light responsive cell within the meter, the combination of: a hollow cylindrical casing means having a bottom wall, a side wall with an inner cylindrical surface, and a top opening; means covering said top opening and having a window over said index; means forming a light-admitting port in said side wall in alignment with said cell and defining a light path into the casing means perpendicular to the axis of the cylindrical casing means; means for selectively interposing a plurality of light-modifying elements in said light path comprising a carrier means within the casing means rotatable about said axis and having outer face portions rotatably engaging said inner surface and having a plurality of circumferentially spaced openings therein to carry light-modifying elements, and means for rotating the carrier means including an actuating member externally of the covering means and an annular scale-carrying member connecting the actuating member and the carrier means and lying beneath said window; light-limiting means for said port comprising curved band-like shutter elements reciprocally movable to open and close said port and carried in curved passageways in said side wall on opposite sides of the port; and means connected to the carrier means and cooperable with means carried by the light-limiting means for fully opening said port upon selectively positioning said actuating member.

18. In a compound meter as defined in claim 17 wherein said means for fully opening said light-admitting port includes lever means each connected at one end to said shutter elements, spring means interconnecting the other ends of said lever means, and cam means provided on said carrier means for cooperable engagement with said spring means.

19. In a portable compact meter for measuring characteristics of a light source and including operably associated meter, index, and light-responsive cell carried within the meter, the combination of: a hollow casing means including a peripheral wall and top and bottom walls, said top wall being provided with a window over said index; means providing a light-admitting port in said peripheral wall in alignment with said cell and defining a light path into the casing means; means for selectively interposing a plurality of light-modifying elements in said light path comprising a carrier means within the casing means rotatable about an axis perpendicular to the light path and having a plurality of sequentially spaced openings therein adapted to carry selected light-modifying elements; means to rotate the carrier means about said axis including an actuating member externally of the top wall and connected to the carrier means; a scale-carrying means connected to the carrier means to move simultaneously with the carrier means and observable beneath the window; and selective light-admitting means carried by the peripheral wall and slidably positionable over said light-admitting port.

20. In a portable, compact meter for measuring characteristics of a light source and including operably associated meter, index and light-responsive cell carried within the meter, the combination of: a hollow casing means provided with a window over said index; means in the casing means providing a light-admitting port in alignment with said cell and defining a light path to said cell; carrier means within the casing means for interposing a plurality of light-modifying elements in said light path, said carrier means being rotatable about an axis perpendicular to the light path and having a plurality of spaced openings therein adapted to carry selected light-modifying elements; means to rotate the carrier means about said axis including an actuating member externally of the casing means connected to the carrier means; a scale-carrying means associated with the carrier means to simultaneously move therewith and observable beneath said window; shutter means mounted in the casing means to open and close the light-admitting port; and selective light-admitting means mounted on said casing means and positionable over said light-admitting port.

21. In a portable compact meter for measuring characteristics of a light source and including operably associated meter, index, and light responsive cell carried within the meter, the combination of: a hollow casing means provided with a window over said index; means in the casing means providing a light-admitting port in alignment with said cell and defining a light path to said cell; carrier means within the casing means for interposing a plurality of light-modifying elements in said light path, said carrier means being rotatable about an axis perpendicular to the light path and having a plurality of spaced openings therein adapted to carry selected light-modifying elements; means to rotate the carrier means about said axis including an actuating member externally of the casing means connected to the carrier means; a scale-carrying means associated with the carrier means to simultaneously move therewith and observable beneath said window; and light-limiting means for said port including shutter elements movable to open and close the port, a lever arm connected to each shutter element and extending therefrom for pivotal interconnection with the lever arm of the other shutter element at an axis remote from said port, a shutter actuating member mounted in the casing means movable toward and away from said pivotal axis, and means connecting said shutter actuating member to said lever arms.

References Cited in the file of this patent

UNITED STATES PATENTS

| | | |
|---|---|---|
| 2,016,025 | Scribner et al. | Oct. 1, 1935 |
| 2,147,902 | Jakosky | Feb. 21, 1939 |
| 2,190,553 | Tarr | Feb. 13, 1940 |
| 2,337,122 | Norwood | Dec. 21, 1943 |
| 2,462,823 | Woodward | Feb. 22, 1949 |
| 2,585,245 | Harrison | Feb. 12, 1952 |
| 2,587,602 | Crandell | Mar. 4, 1952 |
| 2,695,547 | Zander | Nov. 30, 1954 |

FOREIGN PATENTS

| | | |
|---|---|---|
| 412,096 | Great Britain | June 21, 1934 |